Figure 1:
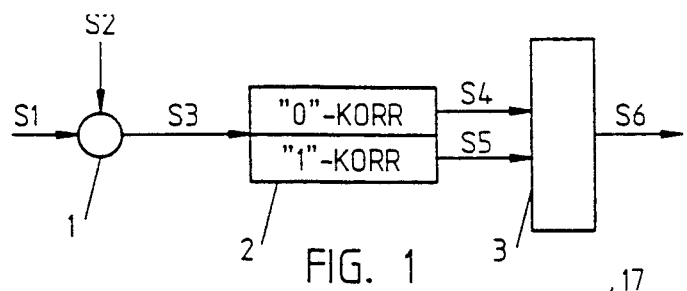

United States Patent [19]

Thorvaldsen

[11] Patent Number: 4,995,052
[45] Date of Patent: Feb. 19, 1991

[54] DEMODULATION METHOD

[75] Inventor: Terje Thorvaldsen, Wittedal, Norway

[73] Assignee: Forsvarets forskningsinstitutt, Kjeller, Norway

[21] Appl. No.: 473,962

[22] PCT Filed: Oct. 12, 1988

[86] PCT No.: PCT/NO88/00075
§ 371 Date: Apr. 13, 1990
§ 102(e) Date: Apr. 13, 1990

[87] PCT Pub. No.: WO89/04095
PCT Pub. Date: May 5, 1989

[30] Foreign Application Priority Data

Oct. 19, 1987 [NO] Norway ................ 874342

[51] Int. Cl.[5] ............ H04B 15/00; H03D 3/10
[52] U.S. Cl. ........................ 375/1; 329/300
[58] Field of Search ........... 375/1, 90; 329/300, 329/302

[56] References Cited

U.S. PATENT DOCUMENTS

| 4,291,410 | 9/1981 | Caples et al. | 375/1 |
| 4,527,275 | 7/1985 | Russell | 375/1 |
| 4,583,048 | 4/1986 | Gumacos et al. | 329/122 |
| 4,694,467 | 9/1987 | Mui | 375/1 |
| 4,707,839 | 11/1987 | Andren et al. | 375/1 |
| 4,716,574 | 12/1987 | Bair et al. | 375/1 |
| 4,873,699 | 10/1989 | Saussier et al. | 375/1 |
| 4,933,952 | 6/1990 | Albrieux et al. | 375/1 |

Primary Examiner—Thomas H. Tarcza
Assistant Examiner—David Cain
Attorney, Agent, or Firm—Christie, Parker & Hale

[57] ABSTRACT

The invention relates to a method for incoherent demodulation of orthogonally coded DSSS signals modulated with MSK or similar modulation types. The data signals are retrieved by splitting the received signal into two parts where the carrier is down converted to baseband by a signal (S12, S22) which is not adapted to the phase of the carrier, whereafter the down converted signals pass a correlator (13, 14), quadrature devices (15, 16) and adding devices (17, 18) and finally a discriminator (19) whic always chooses the highest correlation peak as output signals (S30).

3 Claims, 1 Drawing Sheet

DEMODULATION METHOD

The present invention relates to transfer of data by means of direct sequence spread spectrum signals (DSSS) where the code is modulated on a carrier by means of MSK (Minimum Shift Keying) or related types of modulation, e.g. filtered MSK, and where the receiver does not have to recognize or retrieve the phase of the carrier. This is called incoherent reception.

MSK is a well known modulation technique. It is for instance described in the following articles: Carl Erik Sundberg: Continuous Phase Modulation. IEEE Communication Magazine, April 1986; S. Pasupathy: Minimum Shift Keying; A spectrally efficient Modulation. IEEE Communication Magazine, July 1979; F. Amoroso, J. A. Kivett: Simplified MSK Signaling Technique. IEEE Transactions on Communications, April 1977. The technique is efficient in the sense that the bandwidth which is required for transferring a certain amount of information per second is less than what for instance is required in connection with phase shift keying (PSK). In addition the MSK technique gives a greater possibility for operating with a constant envelope in a bandwidth limited channel than many other modulation techniques. These two characteristics make MSK an attractive form of modulation.

DSSS is a well known coding method within military communication where the purpose a.o. is to make the receiver less sensitive to disturbing signals. The method is for instance described in a book by R. C. Dixon: Spread Spectrum Systems, Wiley 1976 and it is based on the principle of coding every single data bit with a code which is known by the receiver. The code is usually modulated on the carrier with PSK, but MSK has also been used. The data are usually modulated with differential phase shift keying (DPSK).

Orthogonal signalling is a known modulation method which is described in a book by J. G. Proakis: Digital Communications, Mc Graw Hill 1983. This modulation method is based on the principle of letting a number of data bits (e.g. 1) be represented by a number of different (orthogonal) codes (e.g. 2). The receiver must be able to detect which of the orthogonal codes (e.g. 2) which was transmitted. When a code has been chosen to be the correct one, the receiver can determine the data bit which was transmitted. The method is commonly used for incoherent reception and in cases where the bandwidth in a channel is greatly limited.

Incoherent operation is used in receivers which cannot rely on phase information for demodulation of data, because such information is not available. This has e.g. been described in the mentioned book by J. G. Proakis. The signal in such a receiver is split in an inphase and a quadrature channel and the signal in each of these is squared, whereupon the two channels are added. It is impossible to use this method directly in connection with MSK.

From U.S. Pat. No. 4,583,048 there is known an MSK digital demodulator for burst communication. The object of the demodulator described is to undertake a rapid measurement of the phase difference between the incoming carrier and the local reference, so that coherent, conventional reception of data can take place. It is emphasized in the patent how important it is with burst communication systems to regain phase coherency rapidly, and it is pointed out that this cannot be obtained with conventional methods (PPL). The patent does, however, not mention anywhere how data demodulation is obtained. It appears that only the mutual amplitude of the four correlation peaks from each of the two paths are measured incoherently. These measurements are used to regain the phase so that the system can be brought to operate as a conventional coherent system for demodulation of data.

The purpose of the present invention is to provide a method for incoherent demodulation of a carrier of orthogonally coded DSSS signals which are modulated with MSK or related modulation types.

The main features of the invention are defined in the claims. In the present system the orthogonal codes are identical with the spreading code for the DSSS signals. Extraction of data is obtained by combining the above known techniques. The result is that MSK modulated signals can be received in an incoherent receiver even with very low signal to noise ratio on the radio channel.

Figure 2:
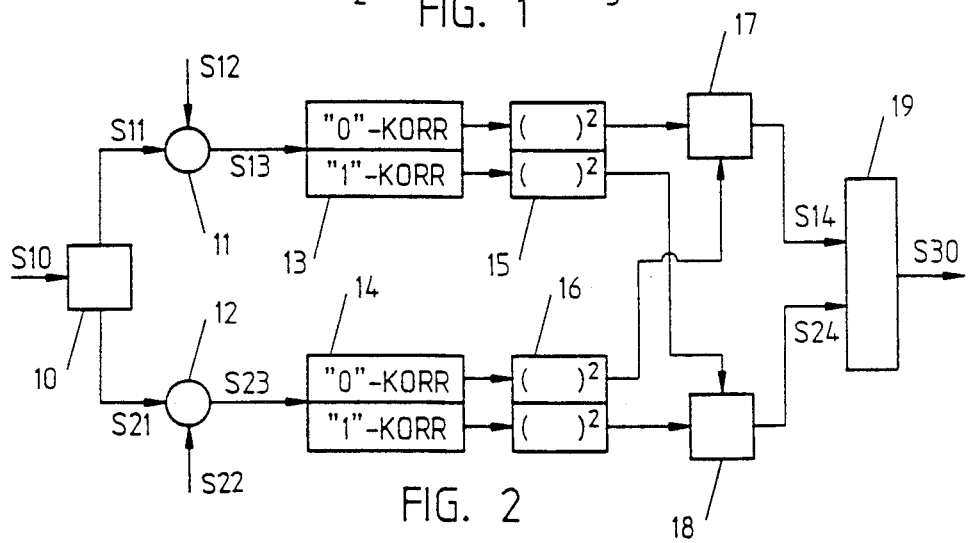
Figure 3:
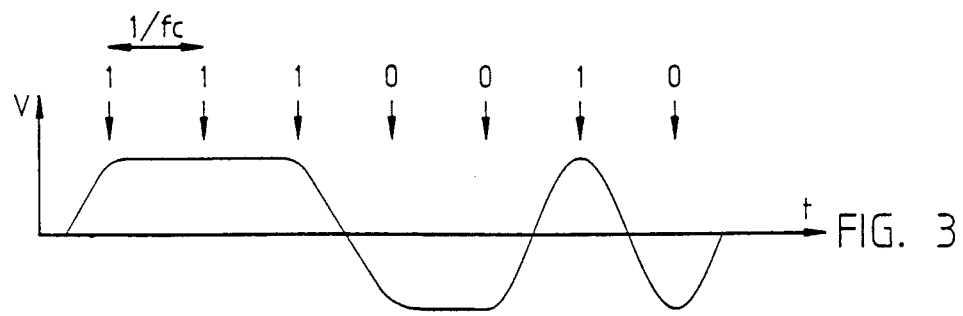
Figure 4:
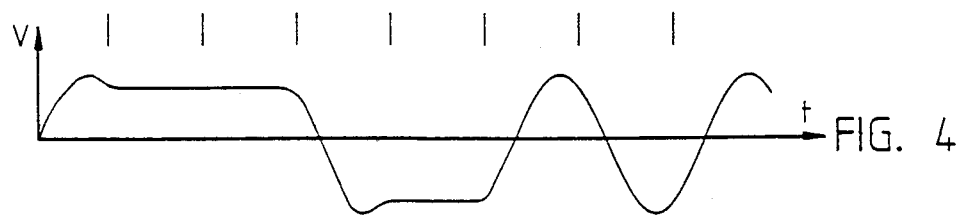
Figure 5:
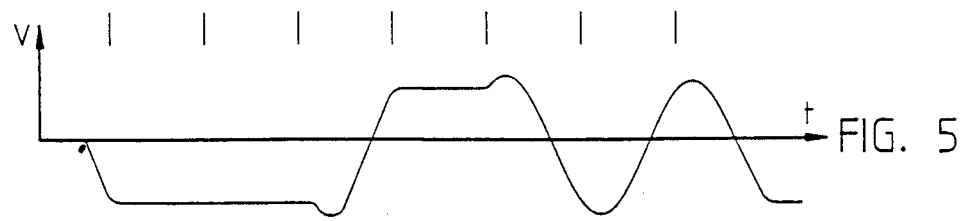

Above mentioned and other features and objects of the present invention will clearly appear from the following detailed description of embodiments of the invention taken in conjunction with the drawings, where FIG. 1 schematically shows a known signal receiver principle, FIG. 2 schematically shows the principle of the receiver according to the present invention, FIG. 3 shows the retrieved signal form in the known receiver, FIGS. 4 and 5 show an example of retrieved signals in the receiver shown in FIG. 2, for an arbitrary phase.

The associated transmitter uses MSK modulation as described by Amoroso and Kivett in the above mentioned article, in order to modulate a carrier with information. We call the carrier frequency fo and the speed with which the spreading code is modulated for fc, the chiprate.

An incoming signal S1 contains the code 1110010. In the known receiver in FIG. 1, this signal is mixed in a mixing circuit 1, with a signal S2 which can be written as $\sin(2\pi(f_o - \frac{1}{4}f_c) + \pi/2)$. The resulting signal S2 is indicated in FIG. 3. The mixing signal S2 has the correct phase in the coherent system. When the samples of the signal are taken at a correct time, —which requires clock retrieval—, as indicated with arrows, the transmitted information (1110010) may be retrieved directly. A possible signal in an orthogonal channel is not used. The signal S3 is directed through a correlator 2 to a logic circuit 3 in which there from the two input signals S4 and S5 is chosen a signal S6.

The receiver shown in FIG. 2 functions as follows: A signal S10 which is an orthogonally coded DSSS signal modulated with MSK, is first divided into two equal parts, S11 and S21 in a splitting circuit 10. The signal parts S11 and S21 are then down converted, in mixing circuits 11 and 12 to basebands in two channels having a frequency which differs from the carrier by 0,25 of fc. The mixer signals S12 and S22 may respectively be expressed as $\sin(2\pi(f_o - \frac{1}{4}f_c) + \phi)$ and $\cos(2\pi(f_o - \frac{1}{4}f_c) + \phi)$. The phase $\phi$ is arbitrary so that the baseband signals in each path are not necessarily similar to the transmitted signals, such as is the case in the mentioned article. This distinguishes our receiver from all previous receivers for MSK, as e.g. the one which is shown in the mentioned article and which is a coherent receiver for MSK.

In the present system the shapes of the signals S13 and S23 may be totally different from the shape of the signal S3, FIG. 3, as shown in the FIGS. 4 and 5.

These signal forms are representative for the case where the signal is respectively 45 and 135 degrees out of phase. Firstly, we can observe that the amplitudes have changed. In addition the peaks have moved to the left. But it can be shown that if the signals in both parts are correlated with the transmitted code for thereafter being squared and added, the autocorrelation function is constant in position as well as in amplitude, independent of the phase. This is the basis for incoherent demodulation.

The baseband signals are transferred to a bank of correlators 13 and 14, each being set up with its own code (e.g. 2). After correlation a square function is made in quadrature devices 15 and 16 and the signals are finally added in adding devices 17 and 18. In a logic circuit or discriminator device 19 the amplitudes of the signals S14 and S24 are compared on the outputs (e.g. 2), and the code which gives the highest correlation peak is declared as the one that was sent, as represented by the signal S30.

Before the data transmission can start the receiver will have to be synchronized with the transmitter, i.e. the time of arrival for the codes must be determined. This synchronizing system is not shown.

The above detailed description of embodiments of this invention must be taken as examples only and should not be considered as limitations on the scope of protection.

I claim:

1. Method for demodulating data represented by orthogonally coded Direct Sequence Spread Spectrum Signals (DSSS) which in a transmitter is modulated on a carrier with MSK (Minimum Shift Keying) (or related continuous phase modulation types) and which in a receiver is down converted to baseband with a frequency which is shifted with $\frac{1}{4}$ chiprate relatively to the center frequency of the received signal by two signals which are 90 degrees out of phase with each other, in two orthogonal channels with individual identical correlators (or banks of correlators), squared in quadrature devices and thereafter added in adding devices, characterized in this that information about the transmitted code and thereby also about the transmitted data are extracted in a discriminator device by choosing the code which gives the highest correlation peak out of the adding devices in spite of the fact that the phase difference between the signal which is used for down conversion to baseband and the center frequency of the transmitted signal remains unknown and even slowly varying (incoherent demodulation), and in spite of the fact that the modulation method used to modulate the carrier is MSK or a related modulation type.

2. Method according to claim 1, characterized in this that each of the down converted signals are correlated in at least two paths and are squared in individual devices.

3. Method according to claim 2, characterized in this that individual parts of the correlated, squared signals are added in individual adding devices for producing comparable added signals.

* * * * *

UNITED STATES PATENT AND TRADEMARK OFFICE
CERTIFICATE OF CORRECTION

PATENT NO. : 4,995,052  
DATED : February 19, 1991  
INVENTOR(S) : Terje Thorvaldsen It is certified that error appears in the above-identified patent and that said Letters Patent is hereby corrected as shown below:

Abstract, line 10, change "whic" to -- which --.

Column 1, line 53, change "mentioned" to
 -- above-mentioned --.
Column 2, line 15, change "above" to
 -- above-mentioned --.
Column 2, line 19, change "Above mentioned" to -- The above-
 mentioned --.
Column 2, line 22, change "where" to -- wherein --.
Column 2, line 32, change "above mentioned" to
 -- above-mentioned --.
Column 2, line 40, change "S2" to -- S3 --.
Column 2, line 48, delete "there"
Column 2, line 49, insert "there" after "S5".
Column 2, line 61, change "mentioned" to
 -- above-mentioned --.
Column 2, line 64, change "mentioned" to
 -- above-mentioned --.

UNITED STATES PATENT AND TRADEMARK OFFICE
CERTIFICATE OF CORRECTION

PATENT NO. : 4,995,052

DATED : February 19, 1991

INVENTOR(S) : Terje Thorvaldsen

It is certified that error appears in the above-identified patent and that said Letters Patent is hereby corrected as shown below:

Column 4, lines 10,11, change "characterized in this that" to -- wherein --.

Column 4, lines 23,24, change "characterized in this that" to -- wherein --.

Column 4, lines 27,28, change "characterized in this that" to -- wherein --.

Signed and Sealed this

Eighteenth Day of August, 1992

Attest:

DOUGLAS B. COMER

*Attesting Officer*  *Acting Commissioner of Patents and Trademarks*